United States Patent [19]

Anderson et al.

[11] Patent Number: 5,639,412
[45] Date of Patent: Jun. 17, 1997

[54] SUBSTITUTED SILICA SOL

[75] Inventors: Marc A. Anderson; Lixin Chu, both of Madison, Wis.

[73] Assignee: Wisconsin Alumni Research Foundation, Madison, Wis.

[21] Appl. No.: 458,933

[22] Filed: Jun. 2, 1995

Related U.S. Application Data

[62] Division of Ser. No. 196,341, Feb. 14, 1994, Pat. No. 5,439,624.

[51] Int. Cl.$^6$ ................................................. B01J 13/00
[52] U.S. Cl. ............................ 252/313.2; 252/315.6; 501/12; 502/238
[58] Field of Search .......................... 252/313.1, 313.2, 252/315.01, 315.6, 315.7; 501/12; 502/238

[56] References Cited

U.S. PATENT DOCUMENTS

| | | | |
|---|---|---|---|
| 2,627,933 | 2/1953 | Teter | 96/10 |
| 2,892,797 | 6/1959 | Alexander et al. | 252/313.2 |
| 3,892,580 | 7/1975 | Messing | 501/80 |
| 3,940,912 | 3/1976 | Buchner | 423/658.2 |
| 4,151,060 | 4/1979 | Isenberg | 204/428 |
| 4,158,621 | 6/1979 | Swift et al. | 208/114 |
| 4,451,388 | 5/1984 | Payne | 252/313.2 |
| 4,483,694 | 11/1984 | Takamura et al. | 96/12 |
| 4,584,280 | 4/1986 | Nanao et al. | 501/80 |
| 4,764,357 | 8/1988 | Sherif et al. | 505/440 |
| 4,800,051 | 1/1989 | Yan | 501/12 X |
| 4,801,399 | 1/1989 | Clark et al. | 252/315.01 |
| 4,888,033 | 12/1989 | Charpin et al. | 252/315.7 |
| 4,902,307 | 2/1990 | Gavalas et al. | 65/30.13 X |
| 4,929,406 | 5/1990 | Abe et al. | 264/45.5 |
| 4,981,676 | 1/1991 | Minet et al. | 423/652 |
| 5,006,248 | 4/1991 | Anderson et al. | 210/500.25 |
| 5,028,568 | 7/1991 | Anderson et al. | 501/12 |
| 5,069,794 | 12/1991 | Haag et al. | 210/650 |
| 5,104,539 | 4/1992 | Anderson et al. | 210/500.25 |
| 5,108,465 | 4/1992 | Bauer et al. | 95/54 |
| 5,110,478 | 5/1992 | Haag et al. | 210/650 |
| 5,139,540 | 8/1992 | Najjar et al. | 95/47 |
| 5,139,541 | 8/1992 | Edlund | 95/56 |
| 5,160,352 | 11/1992 | Najjar et al. | 95/47 |
| 5,160,455 | 11/1992 | Clark et al. | 252/315.7 |

(List continued on next page.)

FOREIGN PATENT DOCUMENTS

| | | |
|---|---|---|
| WO89/00983 | 2/1989 | European Pat. Off. . |
| 0362898 | 4/1990 | European Pat. Off. . |
| 0458217 | 11/1991 | European Pat. Off. . |
| 2177881 | 11/1973 | France . |
| 3918190 | 12/1990 | Germany . |
| 55-119420 | 9/1980 | Japan . |
| 57-207533 | 12/1982 | Japan . |
| 59-177117 | 10/1984 | Japan . |
| 0604826 | 7/1978 | Switzerland . |
| 2267486 | 12/1993 | United Kingdom . |
| WO93/06926 | 4/1993 | WIPO . |

OTHER PUBLICATIONS

Stöber (Stoeber) et al., "Controlled Growth of Monodisperse silica spheres in the Micron Size Range", *J. Colloid and Interface Science*, 26, 62–69 (1968).

Chen, et al., "Sol–Gel Processing of Silica: 1. The Role of the Starting Compounds," *J. Non–Crystalline Solids*, 81:227–237 (1986).

(List continued on next page.)

*Primary Examiner*—Richard D. Lovering
*Assistant Examiner*—Daniel S. Metzmaier
*Attorney, Agent, or Firm*—Quarles & Brady

[57] ABSTRACT

A method for producing high surface area, thermally stable, microporous porous ceramic materials involves replacing a portion of the silicon in a sol or gel comprising silica (silicon dioxide) with cations of another metal. The metal-substituted silica sols are dried and fired to yield porous ceramic materials. Similarly, metal-substituted gels are fired to yield porous ceramic materials. When compared with unsubstituted silica materials, the materials thus produced offer advantageous benefits including improved stability in a basic environment, enhanced thermal stability, and advantageous surface properties such as intrinsic negative charge.

7 Claims, 4 Drawing Sheets

U.S. PATENT DOCUMENTS

| | | | |
|---|---|---|---|
| 5,160,713 | 11/1992 | Mazanec et al. | 423/210 |
| 5,162,301 | 11/1992 | Reich et al. | 505/150 |
| 5,169,576 | 12/1992 | Anderson et al. | 501/12 X |
| 5,171,449 | 12/1992 | Pasternak et al. | 210/640 |
| 5,183,482 | 2/1993 | Najjar et al. | 95/51 |
| 5,194,200 | 3/1993 | Anderson et al. | 264/56 |
| 5,196,380 | 3/1993 | Shadman | 502/4 |
| 5,268,101 | 12/1993 | Anderson et al. | 501/12 X |
| 5,342,431 | 8/1994 | Anderson et al. | 956/45 |

OTHER PUBLICATIONS

Johnson, D.W., "Sol–Gel Processing of Ceramics and Glass," *Am. Ceram. Soc. Bull.*, 64:1597–1602 (1985).

Kamiya, et al., "Preparation of $TiO_2$ Fibers by Hydrolysis and Polycondensation of $Ti(O-i-C_3H_7)_4$," *J. Chem. Eng. Japan*, 19:72–77 (1986).

Yoko, et al., "Photoelectrochemcial Properties of $TiO_2$ Films Prepared by the Sol–Gel Method," *Yogyo–Kyokan–Shi*, 95:13–17 (1987).

Asaeda, et al., "Separation of Alcohol/Water Gaseous Mixtures by Thin Ceramic Membrane," *J. Chem. Eng. Japan*, 19:72–77 (1986).

Anderson, et al., "Titania and Alumina Ceramic Membranes," *39 J. Memb. Sci.*, 243–258 (1988).

Leenaars, A.F.M., et al., "The Preparation and Characterization of Alumina Membranes with Ultra–fine Pores. Part 1. Microstructural Investigations on Non–supported Membranes," *J. Mater. Sci.* 19:1077 (1984).

Leenaars, A.F.M., et al., "The Preparation and Chracterization of Alumina Membranes with Utlra–fine Pores. Part 3. The Permeability for Pure Liquids, " *J. Membrane Sci.* 24:245 (1985).

Leenaars, A.F.M., et al., "The Preparation and Characterization of Alumina Membranes with Ultra–fine Pores. Part 4. Ultrafiltration and Hyperfiltration Experiments," *J. Membrane Sci.* 24:261 (1985).

Leenaars, A.F.M., et al., "Porous Alumina Membranes," *Chem Tech* 560–564 (Sep. 1986).

Yoldas, B.E., "A Transparent Porous Alumina," *Am. Ceram. Soc. Bull.*, 54:286–288 (1975).

Yoldas, B. E., "Alumina Sol Preparation from Alkoxides," *Am. Ceram. Soc. Bull.*, 51:289–290 (1975).

Yoldas, B.E., "Preparation of Glasses and Ceramics from Metal–Organic Compounds," *J. Mater. Sci.*, 12:1203–1208 (1977).

SUBSTITUTED SILICA SOL

This is a division of application Ser. No. 08/196,341 filed Feb. 14, 1994, U.S. Pat. No. 5,439,624.

FIELD OF THE INVENTION

The present invention relates to the field of ceramic materials in general and relates in particular, to the field of porous ceramic materials with small pore sizes.

BACKGROUND OF THE INVENTION

Ceramic materials have a variety of industrial and scientific uses, the most common of which is use in separation processes. Ceramic materials also find utility as adsorbents and catalysts, and need not be provided in membrane form. Organic membranes are often currently used in industry for separation processes, but ceramic membranes offer several advantages over organic membranes. Ceramic materials are more resistant than organic materials to organic solvents, chlorine, and extremes of pH. Ceramic materials are also inherently more stable at high temperatures, thus allowing more efficient sterilization of process equipment than is possible with organic materials. Ceramic materials are generally quite resistant to microbial or biological degradation, which can occasionally be a problem with organic materials. Ceramic materials are also more mechanically stable under high pressures.

The mechanism of operation and types of separations which can be achieved by ceramic membranes are discussed in general by Asaeda et al., *Jour. of Chem. Eng. of Japan*, 19[1]: 72–77 (1986). At least one line of ceramic filters is currently marketed under the trade name "Ceraflo" by the Norton Company of Worcester, Mass.

Ceramic materials may be formed in particulate or polymeric manners. Anderson, et al., *J. Memb. Sci* 39: 243–258 (1988), describes different methods of making both particulate and polymeric sols from transition metal oxides. In general, particulate materials have a smaller average pore diameter and a narrower pore size distribution as compared to polymeric materials.

Particulate ceramic materials are typically formed through a process beginning with metal-organic compounds. The compounds are hydrolyzed to form small metal oxide clusters which in turn condense or aggregate to form metal oxide particles. The particles are fused into a unitary ceramic material. The gaps between the fused particles form a series of pores in the material.

The creation of these metal oxide ceramic materials is generally conducted through a sol-gel procedure. Usually, the metal oxide is initiated into the process as a metal alkoxide solution. The metal is hydrolyzed to metal hydroxide monomers, clusters or particles, depending on the quantity of solvent used. The insoluble metal oxide particles are then peptized by the addition of an acid, or in some cases a base, which causes the particles of the metal oxide to have a greater tendency to remain in suspension, presumably due to charges acquired by the particles during the peptizing process.

Such a sol can be evaporated to form a gel, which is a semi-solid material. Further evaporation to a xerogel, and then sintering of the xerogel results in a durable rigid material which can either be formed as an unsupported material or as a supported material coated onto a substrate. This substrate can be either porous or non-porous and either metallic or non-metallic, depending on the particular application.

Two current limitations on the use of ceramic materials are the fabrication materials and the material pore size and distribution range. With regard to the composition of the materials, ceramic materials have been created using many starting materials. For example, Leenaars et al., *Jour. of Membrane Science*, 24: 261–270 (1985), report the use of the sol-gel procedure to prepare supported and unsupported alumina membranes. However, this particular sol-gel process had inherent lower limits as to the size of the particles that could be produced in the sol thus making a lower limit on the size of the pores in the membranes. Ceramic membranes composed of titania, zirconium and other metal oxides have also been reported.

Alumina membranes have been extensively studied. In particular, Yoldas conducted significant research on the fabrication of gamma-alumina membranes made by a sol-gel process. Yoldas was able to achieve a relatively small particle size in the sols and was able to achieve porous membranes. Yoldas, *Jour. Mat. Sci.*, 12:6, pp. 1203–1208 (1977). In general, however, the method of Yoldas did not permit sufficiently fine control over the sol-gel process to produce uniformly small particles. As a result, the resulting membranes proved less useful for filtration, catalysis or adsorption. For example, in the transparent alumina membranes Yoldas reported that he was able to achieve materials that had small pores, having a radius less than 50 Angstrom, but only in conjunction with the materials which had "larger river-like pores" having a significantly higher radius and contributing significantly to the porosity of the material. Yoldas, *Cer. Bull.*, 54:3, 286–288 (1975).

Yoldas also investigated the manufacture, through the sol-gel processes, of mixed alumina and silica materials. One class of materials which Yoldas prepared were alumina-siloxane derivatives which formed polymeric cross-linkages making polymeric, rather than particulate, ceramic materials. Yoldas was also able to make several large dense monolithic glass samples of varying compositions of silica and alumina that did retain some porosity and high surface area, as described in the article in *Jour. Mat. Sci.*, supra. Yoldas did not report any ability to make particulate aluminosilicate porous membranes, or the ability to make aluminosilicate membranes having high porosity with exceedingly small pore sizes approaching those of the alumina membranes which he had made.

Substituted silicates, such as aluminosilicates having Si as the major component, exhibit a number of advantages such as thermal and chemical stability, mechanical strength and active surface properties. These materials have wide application in the areas of catalysis, catalyst support and separation. Most commercially available porous aluminosilicates are varied zeolites. Recently, the use of amorphous aluminosilicates as acid catalysts has attracted great attention. One of the reasons is that compared with zeolites, the synthesis of amorphous silicates can be carried out under more moderate conditions, for instance, room temperature and pressure.

In certain application areas, such as catalysis and separation, microporous ceramic materials are desired. In these cases, the products must have a large pore volume, a high surface area and a pore diameter as small as 5–10 Å. At the same time, these ceramic materials must have a stable microstructure to withstand sintering at high temperature and under harsh chemical conditions.

Sol-gel methods have been employed to fabricate aluminosilicates in several published studies. Most previous authors have applied sol-gel techniques to prepare various aluminosilicates either as dense monoliths or as powders. When alkoxides are used as precursors, a prehydrolyzed tetraethyl orthosilicate (TEOS) is usually mixed with an aluminum alkoxide followed by hydrolysis and condensation of this molecular level mixture. However, Al-OR and Si-OR bonding have different hydrolysis rates which can cause non-homogenous products. Nanoscale mixed gels of dipbasic alumina and silica were obtained by mixing boemite and silica sols, both having colloidal particles in the nanometer size range. Thermal stable mesoporosity was found in these gels. These mixed gels have two phases even after being fired at 1000° C.

In order for the materials to be useful for filtration, the pore size of the material is preferably within a relatively narrow range, so that larger species are excluded from the material passing through the filtrate. It is also useful to achieve pore sizes of less than 100 Angstroms, which are useful for many separation applications. Examples of such applications include ultrafiltration, reverse osmosis, molecular sieving and gas separation. The ability to achieve materials having a defined pore size which is even less than 20 Angstroms has significant additional advantage.

In one earlier publication, Anderson and Chu have reported a sol-gel method for preparing pure silica gels having high surface area and pore size as small as 10 Å. Unfortunately, the utility of these gels is limited by poor thermal and chemical stability under some conditions.

Anderson and Sheng have shown that aluminosilicate ceramic materials can be made by mixing together and heating an alumina sol and a silica sol or from a single mixed alumina/silica sol. By varying the relative concentrations of alumina and silica in those materials, one varies the charge properties of the materials formed. Thus the charge properties of the mixed ceramic materials of Anderson and Sheng are intermediate between those formed of pure silica and those of pure alumina.

It would be desirable to produce ceramic materials having charge properties similar to pure silica ceramic materials, yet having improved thermal and chemical properties.

SUMMARY OF THE INVENTION

The present invention is a sol-gel method for forming a metal oxide porous ceramic material, wherein the metal oxide is primarily silica but wherein a fraction of the atoms in the ceramic matrix at the surface of the material are cations of a metal other than silicon that confers advantageous thermal, chemical, and mechanical properties upon the porous ceramic material formed.

The method of the present invention involves substituting cations of a metal other than silicon in place of a fraction of the silicon ions on the surface of silica ($SiO_2$) particles in a silica sol or, alternatively, in a gel formed from a silica sol. The substituted sol or gel is then formed into a porous ceramic material.

A porous ceramic material thus formed from such a sol or xerogel is advantageous in that although the surface substitution has little effect on the isoelectric point of the material, significant improvements in the thermal, chemical and mechanical properties are observed. In addition, the large surface area and small, narrowly distributed mean pore diameter of particulate ceramic materials thus formed make these materials particularly useful for catalysis and separation.

The invention is also the substituted nano-sized sol particles, xerogels, gels and ceramic materials produced by the method.

It is an object of the present invention to provide a simpler and cleaner method than existing methods for producing high surface area substituted porous ceramic materials.

It is another object of the present invention to produce materials having better microstructure and enhanced thermal stability over existing porous ceramic materials.

It is an advantage of the present invention that materials are produced which have very high thermal stability, high surface area, and small mean pore diameters.

It is another advantage of the present invention that the microstructure of the material remains stable when confronted with high temperatures or harsh chemical conditions.

It is yet another advantage of the present invention that the pore diameter distribution of the materials formed is very narrow, permitting size-based separation processes to be carried out.

It is a feature of the present invention that metal cations are substituted into Si sites on the surface of the silica framework, rather than throughout the silica framework.

It is a feature of the present invention that the particles of the sol are smaller in size than those formed by previous methods, thus facilitating the production of 5 crack-free, microporous ceramic materials.

DETAILED DESCRIPTION OF THE PREFERRED EMBODIMENT

The stability and surface properties of silica ceramic materials are significantly improved by introducing cations of a non-silicon metal as a second component into precursor silica sols and gels prepared by known methods. In the method of the present invention, metal cations are substituted for silica atoms at the surface of a silica matrix during formation of the ceramic material. New ceramic materials having small pores, high surface area, better stability and O-metal-O-Si-O type chemical bonding are produced. By selecting an appropriate metal for substitution, the charge properties of the materials thus formed may also be advantageously affected.

Moreover, the method disclosed herein achieves actual substitution of metal cations into the surface of a ceramic material, rather than adding metal atoms throughout the entire matrix as is done in other methods for producing mixed ceramic materials such as aluminosilicate membranes. For example, one method for forming an aluminosilicate, an aluminum-containing moiety [$Al(OH)_3$] is attached to the matrix. In another method, two particulate sols are mixed, or one mixed sol is formed before being dried into gel form. In the present method, a silicon atom in a silica sol or gel is displaced in favor of an aluminum atom. Since most silicon atoms within the matrix of particle-sized silica are internal and, therefore, unavailable for substitution, the ratio of hydrogen (H) to silicon remains relatively invariant, even as the ratio of substituted atoms changes. Thus, little effect on the isoelectric point of the ceramic material is observed.

In this application a porous ceramic material is intended to include porous ceramic materials of all physical forms such as membranes, pellets, ribbons, and films, whether supported or unsupported. The materials may also be adsorbents or catalysts. Ceramic refers to the heating of a dried gel to a temperature sufficiently high to result in fusion of adjacent particles without loss of desired porosity characteristics including diameter and volume.

The substitution reaction can take place either at the surface of particles in a silica sol or at the surface of a gel formed by sintering a silica sol. A silica sol or sintered silica gel starting material for use in the method of the present invention, can be formed in several ways. The first goal is to obtain silica sol particles of highly uniform size by hydrolyzing and condensing an alkyl silicate precursor, such as tetraethyl orthosilicate (TEOS) or tetramethyl orthosilicate (TMOS). Useful methods for forming silica gels are known to the art. For example, an ammonia-catalyzed basic route was described in U.S. Pat. No. 5,194,200, which is incorporated herein by reference. A nitric acid-catalyzed acid route for sol formation is described herein which forms exceptionally small particles in the silica. Such small particles may then be formed into ceramic materials with very small mean pore diameters.

It is preferred that the sol or gel be aqueous-based rather than alcohol-based, to exploit the two phase nature of aqueous sol formation methods. Because it is desirable to produce small particles, it is preferred that rapid hydrolysis be followed by slow condensation. The organic alkyl silicates (e.g., TMOS, TEOS, or TPOS) used in sol formation are immiscible in water. However, at the interfacial boundary between phases rapid hydrolysis can occur once the first hydrolysis product (ROH) forms. It is also possible to speed up the hydrolysis by rapidly stirring the immiscible reaction components. Thereafter, the condensation reaction proceeds relatively slowly.

It is also preferred that the pH of the aqueous phase encourage rapid hydrolysis followed by slow condensation. The concentration of nitric acid in the aqueous phase has a strong effect on the reaction rate and on the pore structure of the products formed. A preferred nitric acid concentration is $10^{-3}$M, although concentrations in the range of $10^{-3}$–$10^{-5}$ have also been used. At the latter concentrations, the gel products formed from sols created have lower density and a more open pore structure.

Table I summarizes the effects of various nitric acid concentrations on pure silica gels formed from TEOS and TMOS.

TABLE I

Effect of Nitric Acid Concentration on the Pore Structure of Silica Gels

| Alkyl Silicate | $HNO_3$ Conc. (M) | Reaction Time* | Type of** Isotherm | SSA*** ($m^2$/g) | Porosity (%) |
|---|---|---|---|---|---|
| TEOS | $10^{-3}$ | 1 hour | II | 18 | 9 |
|  | $10^{-4}$ | 1 day | I | 480 | 37 |
|  | $10^{-5}$ | 3 days | I | 440 | 39 |
| TMOS | $10^{-4}$ | 1 minute | I | 700 | 45 |

*Time consumed for hydrolysis.
**Type of nitrogen adsorption isotherm.
***Specific surface area.

The structure of sols formed by the acid-catalyzed process, and thus of the gels as well, also varies according to the alkyl silicate chosen. To obtain the desired pore size in a gel, it may be necessary to age the precursor sol for a few days before using it to form a gel, particularly when forming unsupported gels.

When using the ammonia-catalyzed method of U.S. Pat. No. 5,194,200, water, ammonia, and an alkyl silicate precursor are stirred together vigorously in a glass bottle for about 30 minutes to produce a silica sol. The sol that forms is dialyzed in pure water (Milli-Q) until the pH of the sol is in the range between 8 and 9.

Regardless of how the silica sol is formed, it may be used directly in the method of the present invention. Introduction of cations at the sol stage may be accomplished by adding a metal salt solution into a silica sol that has been acidified, preferably to about pH 3, using a concentrated acid, preferably nitric acid. At pH values higher than about 3, the tendency of aluminum to precipitate from solution can interfere with successful substitution. By taking into account the molarity of the silica sol and of the metal salt solution, one may readily determine the ratio of metal atoms to silicon atoms on the surfaces of the particles, hereinafter referred to as the metal/Si atomic ratio. The ratio, expressed as a percentage, indicates the percentage of non-silicon metal atoms in the particle or gel surface relative to silicon atoms. It has been found by the present inventors that a ratio of between 1% and 5% metal atoms in the surface layer of $SiO_2$ is preferred to obtain microporous materials. At metal/Si atomic ratios above 5%, mesopores begin to appear. The size of the pores, however, is not a limitation on the scope of the invention. Mesoporous gels formed according to the present invention are also useful and exhibit the same thermal properties as microporous gels. For sols prepared using a nitric acid catalyst, the metal/Si ratio should range between 1% and about 3% if only micropores, rather than mesopores, are desired. This variation is believed to result from the much smaller particle size present in the nitric acid catalyzed silica sol as opposed to that of the ammonia-catalyzed sol.

The primary guideline in selecting a metal as a candidate for substitution into a silica matrix is the size of the metal ion. The metal used must fit roughly within the space left vacant by the removed silicon atom, without otherwise grossly disturbing the structure of the matrix. Therefore, it is believed that any metal having approximately the same ionic radius as silicon may be used in the method of the present invention. Aluminum is the preferred atom used by the present inventors. Aluminum is preferred because of the many uses for aluminosilicates and because of the well developed understanding of aluminosilicate chemistry. In addition, zirconium ions and $Fe^{+++}$ are two other ions having roughly the same size as aluminum that may also be useful.

A second consideration when choosing a metal is the effect that the metal will have on the intrinsic charge on the surface of the ceramic material formed after substitution. The silicon atoms resident in the matrix have a charge of +4. By substituting an atom having a different charge, a net gain or loss of charge at the surface of the material is effected. For example, when aluminum, having a charge of +3, is substituted for silicon, having a charge of +4, the resultant material has a net intrinsic charge of negative 1. It appears that the net negative charge remains constant even as the extent of surface substitution of $Al^{+3}$ cations in place of $Si^{+4}$, increases at least up to about 10%. Of course, by choosing other cations that meet the size criteria but have different valence numbers, it would be possible to produce ceramic materials having other net surface charge.

The metal compound used as a metal source is preferably provided in an ionized form in an aqueous solution. The non-metal portion of the metal compound is not critical, although nitrate is preferred because it can be burned away after substitution. Other preferred non-metal ions are those that are not so reactive as to be likely to form reaction byproducts in the sol or gel and those that are readily available in compound form with useful metals. A convenient compound useful for substituting aluminum cations into silica sols or gels is aluminum nitrate [$Al(NO_3)_3$]. A 1M aluminum nitrate solution may be conveniently used, although the invention may be readily practiced using a solution of a different molarity, simply by determining the amount of aluminum ions being added. Other useful aluminum compounds would include aluminum chloride and aluminum perchlorate. If the metal is zirconium, zirconium oxalate may be used.

The substituted silicate sols thus prepared are then dried by, for example, placing the sols in plastic petri dishes in a desiccator with a drying reagent such as $MgCl_2 \cdot 6H_2O$. Usually, the solvent in the sol evaporates in about 3 days, leaving behind a xerogel that may be sintered at temperatures between about 200° and 900° C. or higher, and preferably at about 500 ° C., to form a porous ceramic material in which a desired percentage of the silicon atoms are replaced.

Methods for forming sols into supported ceramic materials are also known to the art. For instance, it is possible to deposit the sols into the pore spaces of porous materials having large pores, such as membranes, before drying and sintering.

Microporous ceramic materials formed in this method have a narrowly distributed mean pore diameter of less than 20 Å, a high specific surface area and increased thermal stability of the microporous structures upon heating for 1 hour, when compared to pure silica ceramic materials. It is believed that the microporous structures of these materials will remain even after longer exposure to high temperatures. It is also believed that the desirable ability to retain microporosity at high temperatures results from the ability of surface non-silicon metal atoms to resist fusion with each other at temperatures where silicon atoms are more prone to fuse. It is not required that microporous ceramic materials be the product of the process. As noted above, mesoporous materials are also useful and are formed from larger sol particles or by substituting a higher percentage of aluminum cations in place of silica ions.

As noted above, it is also possible, and may be preferable, to introduce cations directly into a sintered silica gel. However, some reduced thermal stability has been observed in ceramic materials in which the cation is introduced at the gel stage compared to ceramic materials in which the cation is introduced at the sol stage. To introduce the cation at the gel stage, silica sols prepared as described above may be dried and fired at about 200° C. or higher, up to about 400 ° C., to sinter the xerogel for 1–1.5 hours before being soaked in a metal salt solution. Again, consideration is given to the relative ratios of the metal and the silica. After about 1 hour, the gel is removed from the surrounding supernatant and the wet gel is dried at a temperature between room temperature and about 40° C. for 24 hours. The gel is then fired in an oven at about 200° C. for about 1 hour. Other firing temperatures may be found that do not destroy the structure of the pores in the gel. This procedure may be repeated several times until a desired metal/Si atomic ratio is achieved. The final firing is performed above 400° C. A metal/Si atomic ratio of about 2% can be achieved in one soaking treatment.

The invention is further clarified by considering the following examples, which are intended to be purely exemplary of the method of the present invention.

As is detailed in the following examples, aluminosilicate materials thus produced exhibit structural properties that make them advantageous for use in a variety of separation processes. The microporous and mesoporous materials retain their high surface area at elevated temperatures and in adverse chemical environments, such as may be encountered during gas phase separations.

EXAMPLES

Introduction of Aluminum into Silica Sol

A 0.5M water-based silica sol at pH 8 was prepared by interfacial hydrolysis of tetra-methyl-orthosilicate (TMOS) in ammonia aqueous solution. To do so, 30 ml of pure water, 1 ml of 30% ammonia, and 3 ml of TMOS were mixed together in a glass bottle. The mixture was stirred vigorously and became homogenous in about 1 minute. The colloidal sol was stirred for about 30 minutes. The resulting product was dialyzed against pure water to wash off excess ammonia and the methanol byproduct. Dialysis continued until the final pH of the sol was about 8–9. The pH of this sol was then adjusted to 3 by adding concentrated nitric acid. A 1M aluminum nitrate solution was used to add aluminum ions into the pH 3 silica sol to achieve the desired Al/Si atomic ratio. For instance, 0.5 ml of the 1M aluminum nitrate solution was added to 40 ml of a 0.5M pH 3 silica sol to achieve a 2.5% Al/Si atomic ratio. A xerogel was produced from the sol by evaporating the solvent in plastic petri dishes. High surface area, unsupported aluminosilicate materials were obtained by calcining the products at 500 ° C.

Substituted sols into which Al ions have been introduced are more stable with respect to gelation than unmodified silica colloids over a range of pH values from about 4 to 6.

Introduction of Aluminum Ions into Silica Gel

Alternatively, a xerogel formed as described was fired at 200° C. for 1–1.5 hours and was soaked in a 1M aluminum nitrate solution. The wet gel was dried at room temperature and fired at 500° C. Analysis by atomic absorption revealed that the material thus treated had an Al/Si atomic ratio of about 2% Al.

Characterization of Microporosity, Thermal Stability, Chemical Stability, and Surface Charge The microporous structure of aluminosilicate gels formed according to the method of the present invention was tested by nitrogen adsorption measurement (BET). FIG. 1 illustrates that only when the Al/Si atomic ratio is 5% Al or lower is there a microporous structure reflected in overlapping adsorption and desorption curves. The gels tested in FIG. 1 were prepared by introducing Al ions at the sol stage. When Al ions were introduced at the gel stage, the gels show similar pore structure to that of pure silica gels.

Figure 1A:
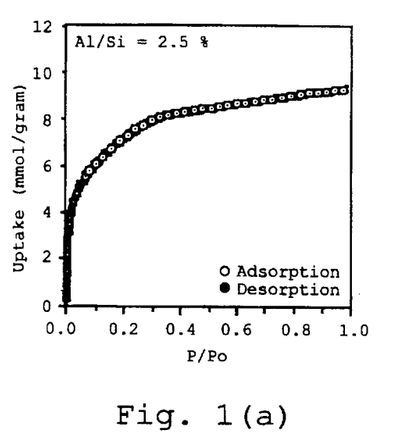
FIG. 1 shows the nitrogen adsorption profile of aluminosilicate gels having surface Al/Si ratios of 2.5%, 5%, 7.5%, and 10% Al, relative to silicon.
Figure 1B:
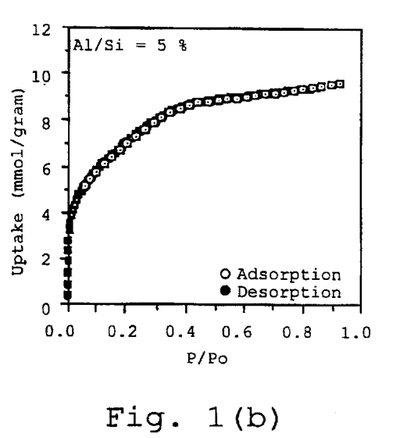
Figure 1C:
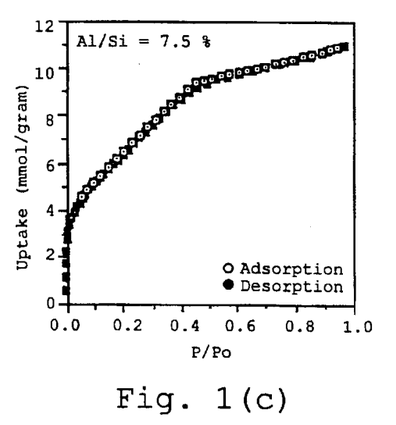
Figure 1D:
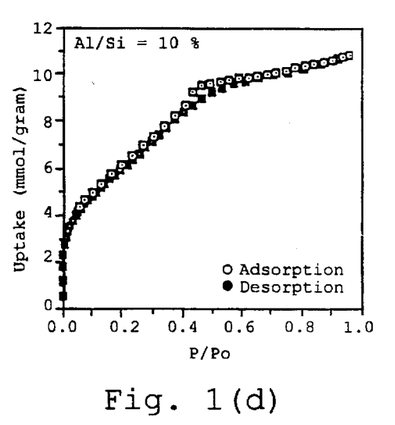
Figure 2:
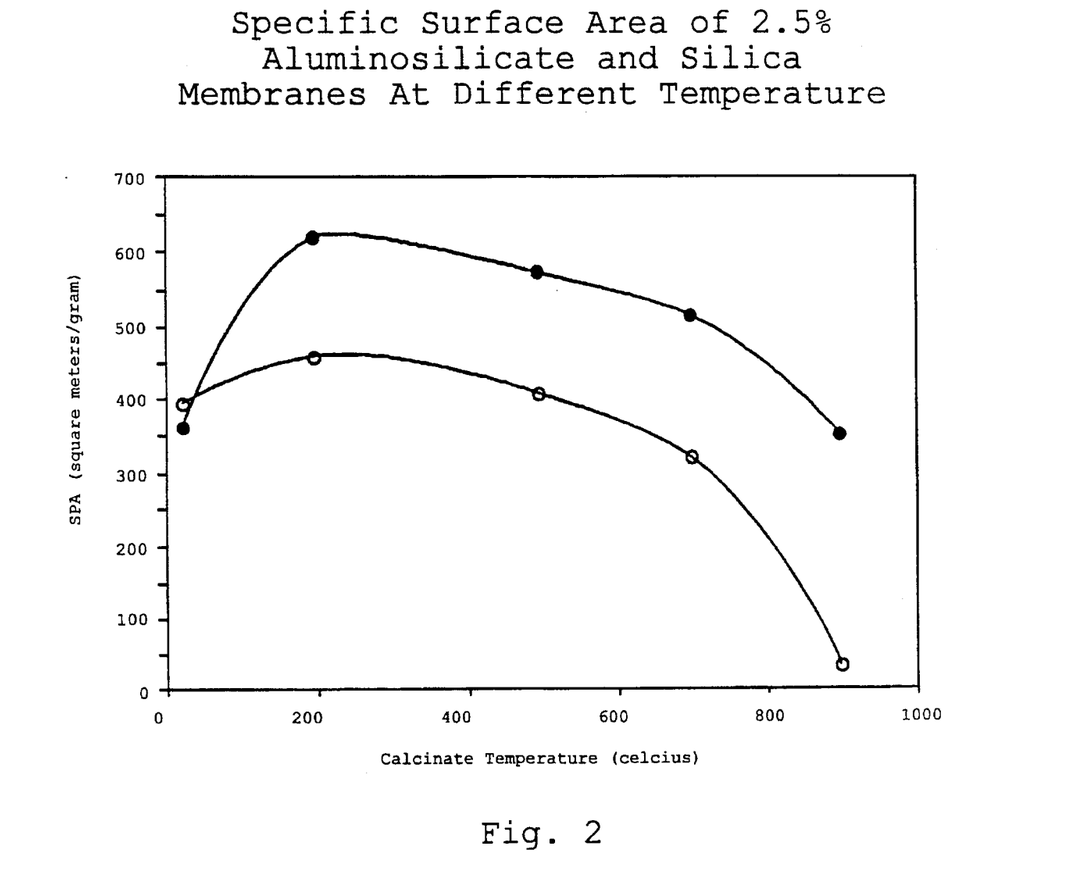
FIG. 2 depicts the specific surface area of pure silica porous ceramic materials and porous ceramic materials containing 2.5% aluminum, relative to silicon, after having been fired at various firing temperatures.

The enhanced thermal stability of materials prepared according to this method is demonstrated in FIG. 2. FIG. 2 shows that when aluminosilicate materials formed by introducing aluminum at the sol stage, and having a 2.5% Al/Si atomic ratio, were fired for 1 hour at various temperatures from 200° C. to 900° C., those materials retained their microporous structure at higher sintering temperatures than pure silica materials. For example at 900° C., pure silica materials, represented as open circles, contain almost no porosity while the 2.5% Al aluminosilicate material retains a specific surface area of higher than 300 $m_2/g$.

Figure 3:
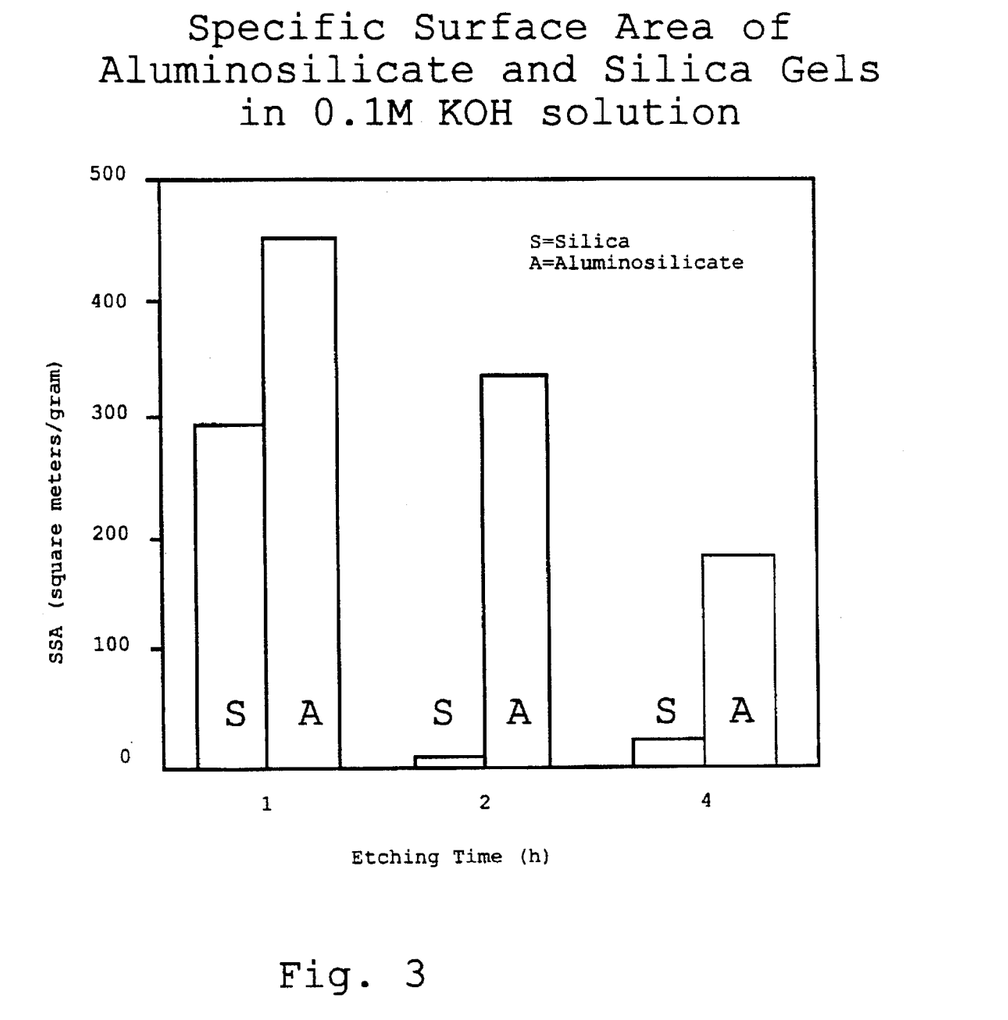
FIG. 3 depicts the ability of aluminosilicate gels to retain specific surface area after treatment with a strong base. The stability of pure silica gels in a strong base is also depicted.

The materials prepared according to the method of the present invention are also more chemically stable than pure microporous silica materials, as a result of the formation of strong O—Al—O—Si—O bonds formed when Al ions are substituted into Si sites in the silica framework. Because it is more difficult to break these O—Al bonds, the material shows lower solubility in aqueous solutions. The chemical stability was tested by immersing the gels in a strongly basic 0.1M KOH solution for several hours to determine whether the structure is damaged by the treatment. After immersion, the gel chips were removed, rinsed, dried in a desiccator, and fired at 200° C. for 1 hour. The materials thus formed were analyzed by BET analysis. FIG. 3 demonstrates that even after 4 hours of immersion in a strongly basic solution, aluminosilicate gels retain a significant percentage of their original specific surface area. In contrast, treatment of pure silica gels in base virtually eliminates the specific surface area in the same period of time.

Figure 4:
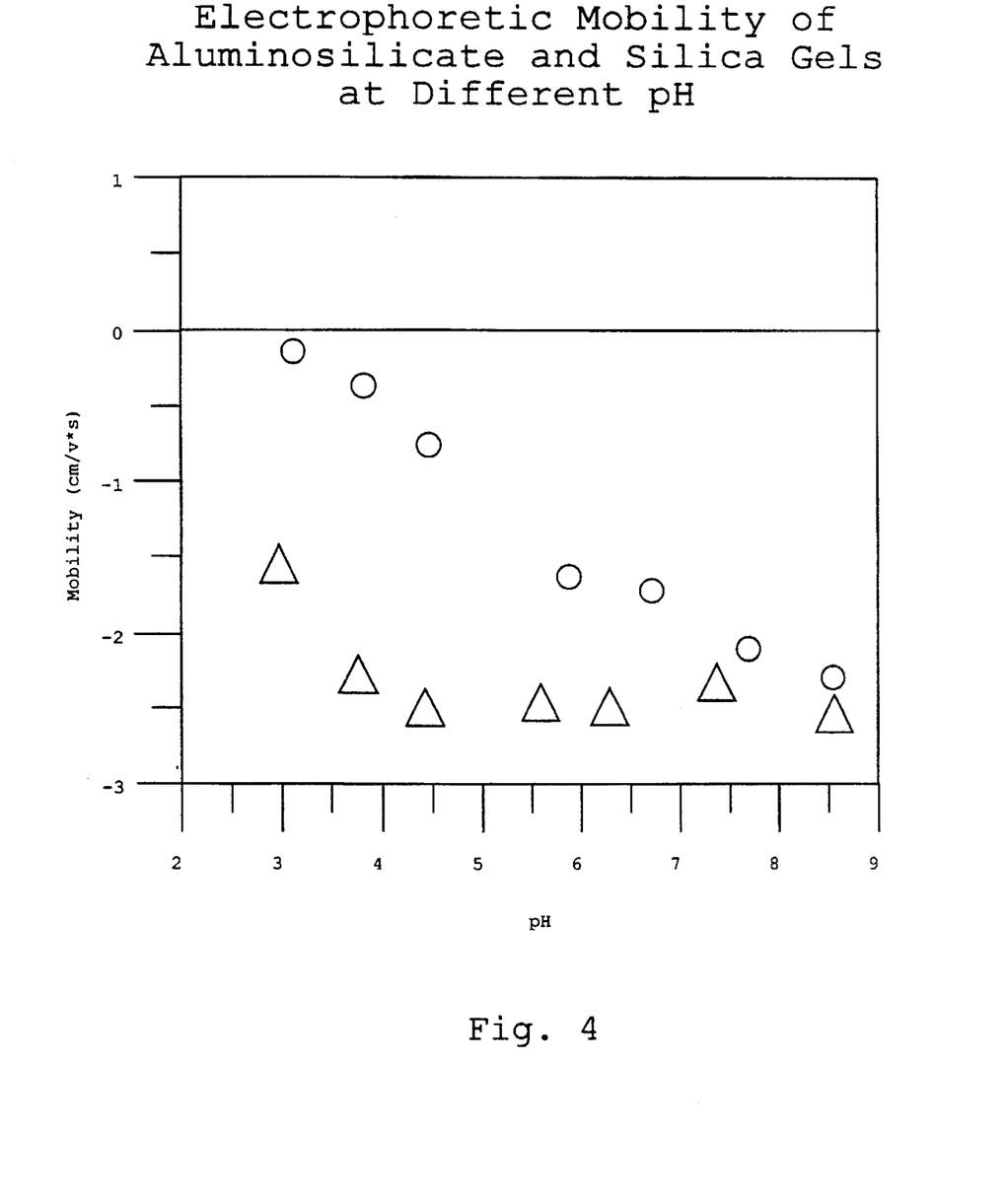
FIG. 4 plots the electrophoretic mobility of aluminosilicate and silica gels at various pH values to demonstrate substitution of aluminum cations for silicon in the surface of a silica matrix.

Finally, the substitution of Al ions into Si sites in the silica framework was demonstrated by measuring the intrinsic negative charge on the surface of the aluminosilicate gel. The surface charge was visualized by observing the electrophoretic mobility of crushed gels in solutions at various pH values. Because an intrinsic negative charge is generated when a trivalent aluminum ion occupies a silicon site in silica, the charge on the Al-substituted silica gel is independent of the solution pH. Accordingly, by testing the electrophoretic mobility of the gel at various pHs, one can monitor the substitution of Al for Si. Only when the electrophoretic mobility curve shows a strong and virtually constant negative charge can one conclude that substitution has occurred. This is precisely what was seen using the aluminosilicate gels generated according to the method of the present invention. As shown in FIG. 4, the charge of the aluminosilicate gel having an Al/Si ratio of 2.5% (triangles) was virtually invariant across a pH range of about 3.5 to 9. In contrast, pure silica gels (circles) showed a linear dependence of charge upon solution pH demonstrating an absence of intrinsic negative charge. The ability to provide a material having a particular surface charge is advantageous in separation processes since it allows greater control of surface chemistry within the material pores.

We claim:

1. A substituted silica sol formed according to a process comprising the steps of:

providing an acidified silica sol at a pH value of no higher than 3, the sol comprising non-polymeric particles of silicon dioxide, each of said particles having a core consisting of silicon dioxide and a surface comprising silicon atoms and oxygen atoms; and combining the acidified sol with a sufficient amount of a solution comprising atoms of a metal at a pH value of no higher than 3, such that a portion of the silicon atoms at the surface of each of the silicon dioxide particles is replaced by atoms of the metal to form a substituted silica sol comprising substituted silicon dioxide particles having a core consisting of silicon dioxide and a surface comprising metal atoms integrated in place of a portion of the silicon atoms, the particles being of a size sufficiently small to coalesce into a microporous material having a mean pore size of about 20 Angstroms or less.

2. A substituted silica sol formed as claimed in claim 1 wherein the acidified sol is prepared by ammonia-catalyzed hydrolysis and condensation of an alkyl silicate.

3. A substituted silica sol formed as claimed in claim 2 wherein the alkyl silicate is selected from the group consisting of TMOS and TEOS.

4. A substituted silica sol formed as claimed in claim 1 wherein the acidified sol is prepared by nitric acid-catalyzed hydrolysis and condensation of an alkyl silicate.

5. A substituted silica sol formed as claimed in claim 4 wherein the alkyl silicate is selected from the group consisting of TMOS and TEOS.

6. A substituted silica sol formed as claimed in claim 1 wherein the solution is aqueous aluminum nitrate.

7. A substituted silica sol as claimed in claim 1 wherein the surface comprises the metal atoms and the silicon atoms in a molar atomic ratio of between 1% and 5%.

* * * * *